United States Patent
Kambhatla

(10) Patent No.: US 11,900,003 B2
(45) Date of Patent: *Feb. 13, 2024

(54) MESSAGE PASSING FRAMEWORK FOR AUDIO/VIDEO STREAMING IN A TOPOLOGY OF DEVICES

(71) Applicant: Intel Corporation, Santa Clara, CA (US)

(72) Inventor: Srikanth Kambhatla, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/559,863

(22) Filed: Dec. 22, 2021

(65) Prior Publication Data

US 2022/0188055 A1 Jun. 16, 2022

Related U.S. Application Data

(63) Continuation of application No. 16/793,603, filed on Feb. 18, 2020, now Pat. No. 11,216,235, which is a (Continued)

(51) Int. Cl.
*G06F 3/14* (2006.01)
*G06F 13/40* (2006.01)
(Continued)

(52) U.S. Cl.
CPC ........ *G06F 3/1423* (2013.01); *G06F 13/4027* (2013.01); *G06F 13/4221* (2013.01); *G09G 5/006* (2013.01); *H04L 65/1089* (2013.01); *H04L 65/61* (2022.05); *G09G 2350/00* (2013.01); *G09G 2352/00* (2013.01);
(Continued)

(58) Field of Classification Search
CPC ............... G06F 3/1423; G06F 13/4027; G06F 13/4221; H04L 65/4069; H04L 65/1089; H04L 43/0882; G09G 5/006
See application file for complete search history.

(56) References Cited

U.S. PATENT DOCUMENTS 5,642,419 A 6/1997 Rosen
5,812,793 A 9/1998 Shakib et al.
(Continued)

FOREIGN PATENT DOCUMENTS

JP 200022699 1/1968
JP 2005537764 12/2005
(Continued)

OTHER PUBLICATIONS

"VESA Display Port Standard, V.1, R.2"—Video Electronics Standards Association, DisplayPort TM, Jan. 5, 2010 https://glenwing.github.io/docs/DP-1.2.pdf (Year: 2010).*
(Continued)

*Primary Examiner* — Randy A Scott
(74) *Attorney, Agent, or Firm* — Hanley, Flight & Zimmerman, LLC

(57) ABSTRACT

A disclosed example involves receiving a message with an action to be performed; determining the message type; and based on the message type, performing an action specified in the message.

21 Claims, 9 Drawing Sheets

Related U.S. Application Data continuation of application No. 15/285,600, filed on Oct. 5, 2016, now Pat. No. 10,564,910, which is a continuation of application No. 12/821,306, filed on Jun. 23, 2010, now abandoned.

(60) Provisional application No. 61/298,936, filed on Jan. 28, 2010.

(51) Int. Cl.
    *G06F 13/42*     (2006.01)
    *H04L 65/61*     (2022.01)
    *H04L 65/1089*     (2022.01)
    *G09G 5/00*     (2006.01)
    *H04L 43/0882*     (2022.01)

(52) U.S. Cl.
    CPC ..... *G09G 2370/04* (2013.01); *G09G 2370/10* (2013.01); *G09G 2370/20* (2013.01); *H04L 43/0882* (2013.01)

(56) References Cited

U.S. PATENT DOCUMENTS

| | | | |
|---|---|---|---|
| 6,160,796 A | 12/2000 | Zou | |
| 6,286,052 B1 | 9/2001 | McCloghrie | |
| 6,477,252 B1 | 11/2002 | Faber et al. | |
| 6,628,615 B1 | 9/2003 | Joseph et al. | |
| 6,654,806 B2 | 11/2003 | Wall et al. | |
| 7,277,421 B1 | 10/2007 | Pershan | |
| 7,356,848 B1 | 4/2008 | Duffield et al. | |
| 7,420,112 B2 | 9/2008 | Juszkiewicz et al. | |
| 7,742,587 B2 | 6/2010 | Cohen | |
| 8,095,680 B2 | 1/2012 | Pettersson et al. | |
| 8,166,179 B2 | 4/2012 | Pickens et al. | |
| 8,248,421 B2 * | 8/2012 | Whitby-Strevens | G09G 5/006 710/15 |
| 8,493,905 B2 | 7/2013 | Kambhatla | |
| 8,631,144 B2 | 1/2014 | Lee | |
| 8,723,756 B2 | 5/2014 | Kim | |
| 8,782,237 B2 | 7/2014 | Kambhatla | |
| 8,984,155 B2 | 3/2015 | Kambhatla | |
| 9,378,172 B2 | 6/2016 | Kambhatla | |
| 10,101,955 B2 | 10/2018 | Kambhatla | |
| 10,564,910 B2 | 2/2020 | Kambhatla | |
| 11,216,235 B2 | 1/2022 | Kambhatla | |
| 2002/0078293 A1 | 6/2002 | Kou et al. | |
| 2002/0104091 A1 | 8/2002 | Prabhu et al. | |
| 2003/0037160 A1 | 2/2003 | Wall et al. | |
| 2003/0056007 A1 | 3/2003 | Katsube et al. | |
| 2003/0079038 A1 | 4/2003 | Robbin et al. | |
| 2004/0081127 A1 | 4/2004 | Gardner et al. | |
| 2004/0128694 A1 | 7/2004 | Bantz et al. | |
| 2004/0151153 A1 | 8/2004 | Henry et al. | |
| 2004/0243617 A1 | 12/2004 | Bayyapu | |
| 2005/0021797 A1 | 1/2005 | Talaat et al. | |
| 2005/0152386 A1 | 7/2005 | Lesartre et al. | |
| 2005/0246329 A1 | 11/2005 | Milirud et al. | |
| 2006/0083259 A1 | 4/2006 | Metcalf et al. | |
| 2006/0168337 A1 | 7/2006 | Stahl et al. | |
| 2006/0177066 A1 | 8/2006 | Han et al. | |
| 2007/0130245 A1 | 6/2007 | So et al. | |
| 2007/0211667 A1 | 9/2007 | Agrawal et al. | |
| 2008/0162725 A1 | 7/2008 | Kambhatla | |
| 2008/0175269 A1 | 7/2008 | Alvarez et al. | |
| 2008/0320539 A1 | 12/2008 | Ohkita | |
| 2009/0113066 A1 | 4/2009 | Van Wie et al. | |
| 2009/0182917 A1 * | 7/2009 | Kim | G06F 3/1438 710/16 |
| 2009/0278763 A1 | 11/2009 | Zeng et al. | |
| 2009/0279473 A1 | 11/2009 | Lu et al. | |
| 2009/0295679 A1 | 12/2009 | Lida et al. | |
| 2010/0027549 A1 * | 2/2010 | Satterlee | H04L 45/50 370/395.31 |
| 2010/0188567 A1 | 7/2010 | Ichimura et al. | |
| 2010/0191867 A1 | 7/2010 | Douglas et al. | |
| 2010/0257400 A1 | 10/2010 | Whitby-Strevens | |
| 2010/0271289 A1 | 10/2010 | Goodart et al. | |
| 2010/0272102 A1 * | 10/2010 | Kobayashi | H04N 21/43632 370/389 |
| 2011/0016332 A1 | 1/2011 | Wu et al. | |
| 2011/0047260 A1 | 2/2011 | Jiang et al. | |
| 2011/0184965 A1 | 7/2011 | Kambhatla | |
| 2011/0185026 A1 | 7/2011 | Kambhatla | |
| 2011/0185066 A1 | 7/2011 | Kambhatla | |
| 2011/0255479 A1 | 10/2011 | Liu | |
| 2011/0276975 A1 | 11/2011 | Brown et al. | |
| 2012/0133774 A1 | 5/2012 | Sarhan | |
| 2016/0366472 A1 | 12/2016 | Ichimura et al. | |

FOREIGN PATENT DOCUMENTS

| | | |
|---|---|---|
| JP | 2009515473 | 4/2009 |
| TW | 200910955 | 3/2009 |
| WO | WO9933229 | 7/1999 |
| WO | WO0002337 | 1/2000 |
| WO | WO2009001880 | 12/2008 |

OTHER PUBLICATIONS

"VESA DisplayPort Interoperability Guideline Version 1.1"—Video Electronics Standards Association, DisplayPort TM, Jan. 28, 2008 https://glenwing.github.io/docs/VESA-DP-Dual-Mode-1.1.pdf (Year: 2008).*

"VESA Display Port Standard"—VESA Display Port Standard, Version 1, Revision 2, Jan. 5, 2010 https://glenwing.github.io/docs/DP-1.2.pdf (Year: 2010).

"VESA Display Interoperability Guideline Version 1.1"—VESA, Jan. 28, 2008 https://glenwing.github.io/docs/VESA-DP-Dual-Mode-1.1.pdf (Year: 2010).

Intellectual Property Office, "Combined Search and Examination Report," dated May 27, 2011 in connection with UK Patent Application No. GB1101, 7 pages.

Korean Intellectual Property Office, "Final Office Action," dated Dec. 21, 2012 in connection with Korean Patent Application No. 10-2011-0008381, 5 pages, including English translation.

United States Patent and Trademark Office, "Final Office Action," dated Jan. 16, 2014 in connection with U.S. Appl. No. 12/821,306, 15 pages.

United States Patent and Trademark Office, "Advisory Action," dated May 23, 2013 in connection with U.S. Appl. No. 12/821,306, 2 pages.

United States Patent and Trademark Office, "Final Office Action," dated Mar. 19, 2013 in connection with U.S. Appl. No. 12/821,306, 15 pages.

United States Patent and Trademark Office, "Notice of Panel Decision from Pre-Appeal Brief Review," dated Jul. 31, 2013 in connection with U.S. Appl. No. 12/821,306, 2 pages.

United States Patent and Trademark Office, "Non-Final Office Action," dated Oct. 11, 2013 in connection with U.S. Appl. No. 12/821,306, 14 pages.

United States Patent and Trademark Office, "Advisory Action," dated Mar. 12, 2014 in connection with U.S. Appl. No. 12/821,306, 2 pages.

United States Patent and Trademark Office, "Notice of Panel Decision from Pre-Appeal Brief Review," dated Jun. 3, 2014 in connection with U.S. Appl. No. 12/821,306, 2 pages.

United States Patent and Trademark Office, "Examiner's Answer," dated Sep. 10, 2014 in connection with U.S. Appl. No. 12/821,306, 7 pages.

United States Patent and Trademark Office, "Decision on Appeal," dated Jul. 1, 2016 in connection with U.S. Appl. No. 12/821,306, 15 pages.

United States Patent and Trademark Office, "Decision on Request for Rehearing," dated Aug. 19, 2016 in connection with U.S. Appl. No. 12/821,306, 8 pages.

(56) References Cited

OTHER PUBLICATIONS

Korean Intellectual Property Office, "Notice of Final Rejection," dated Dec. 24, 2013 in connection with Korean Patent Application No. 10-2013-31470, 6 pages, including English translation.

Taiwan International Patent and Law Office, "Office Action and Search Report," dated Oct. 4, 2013 in connection with Taiwan Patent Application No. 100101790, 25 pages, including English translation.

State Intellectual Property Office of China, "Office Action," dated Aug. 27, 2014 in connection with Chinese Patent Application No. 201110037405.9, 7 pages, including English translation.

State Intellectual Property Office of China, "Office Action," dated Feb. 13, 2014 in connection with Chinese Patent Application No. 201110037405.9, 7 pages, including English translation.

State Intellectual Property Office of China, "Office Action," dated May 31, 2013 in connection with Chinese Patent Application No. 201110037405.9, 15 pages, including English translation.

German Patent and Trademark Office, "Office Action," dated Jun. 13, 2016 in connection with German Patent Application No. 10-2011-008-793.1, 5 pages, including English translation.

Japan Patent Office, "Office Action," dated Feb. 12, 2013 in connection with Japanese Patent Application No. 2011-014058, 5 pages, including English translation.

Japan Patent Office, "Office Action," dated Jul. 3, 2012 in connection with Japanese Patent Application No. 2011-014058, 8 pages, including English translation.

Japan Patent Office, "Office Action," dated Aug. 13, 2013 in connection with Japanese Patent Application No. 2011-014058, 6 pages, including English translation.

Korean Intellectual Property Office, "Notice of Preliminary Rejection," dated Jun. 25, 2012 in connection with Korean Patent Application No. 10-2011-8381, 8 pages, including English translation.

Korean Intellectual Property Office, "Notice of Preliminary Rejection," dated Jun. 25, 2013 in connection with Korean Patent Application No. 10-2013-31470, 6 pages, including English Translation.

Taiwan International Patent and Law Office, "Decision of Rejection," dated May 13, 2014 in connection with Taiwan Patent Application No. 100101790, 13 pages, including English translation.

Taiwan International Patent and Law Office, "Office Action," dated Sep. 1, 2015 in connection with Taiwan Patent Application No. 100101790, 5 pages, including English translation.

United States Patent and Trademark Office, "Non-Final Office Action," dated Sep. 4, 2012 in connection with U.S. Appl. No. 12/821,306, 13 pages.

United States Patent and Trademark Office, "Non-Final Office Action," dated Dec. 1, 2016 in connection with U.S. Appl. No. 12/821,306, 13 pages.

Huber B., et al., "Comparison of Implicit Path Enumeration and Model Checking based WCET Analysis," In Proceedings of the 9th International Workshop on Worst-Case Execution Time (WCET) Analysis, 2009, pp. 23-34. Retrieved from [https://www.researchgate.net/publication/221552192_Comparison_of_Implici-t_Path_Enumeration_and_Model_Checking_Based_WCET_Analysis] Oct. 9, 2020.

Intellectual Property Office, "Notice of Allowance," dated Feb. 28, 2012 in connection with UK Patent Application No. GB1101392.7, 2 pages.

Japan Patent Office, "Appeal Decision," dated Apr. 8, 2014 in connection with Japanese Patent Application No. 2011-014058, 2 pages.

Taiwan International Patent and Law Office, "Notice of Allowance," dated Feb. 2, 2016 in connection with Taiwan Patent Application No. 100101790, 2 pages.

United States Patent and Trademark Office, "Non-Final Office Action," dated Oct. 12, 2017 in connection with U.S. Appl. No. 15/285,600, 9 pages.

United States Patent and Trademark Office, "Notice of Allowance," dated Oct. 17, 2019 in connection with U.S. Appl. No. 15/285,600, 9 pages.

State Intellectual Property Office of China, "Notice of Allowance," dated Mar. 19, 2015 in connection with Chinese Patent Application No. 201110037405.9, 4 pages, including English translation.

United States Patent and Trademark Office, "Non-Final Office Action," dated Jun. 18, 2018 in connection with U.S. Appl. No. 15/285,600, 9 pages.

United States Patent and Trademark Office, "Advisory Action," dated Apr. 30, 2018 in connection with U.S. Appl. No. 15/285,600, 3 pages.

United States Patent and Trademark Office, "Final Office Action," dated Nov. 20, 2018 in connection with U.S. Appl. No. 15/285,600, 10 pages.

United States Patent and Trademark Office, "Final Office Action," dated Feb. 5, 2018 in connection with U.S. Appl. No. 15/285,600, 9 pages.

Bhowmik A., et al., "45.2: DisplayPort: The Emerging Converged Digital Display Interface Technology and Implementation in Mobile Computing Platforms," SID 08 Digest, 2008, pp. 673-676, vol. 39.

United States Patent and Trademark Office, "Non-Final Office Action," dated Jul. 19, 2012 in connection with U.S. Appl. No. 12/774,023, 7 pages.

United States Patent and Trademark Office, "Final Office Action," dated Jan. 2, 2013 in connection with U.S. Appl. No. 12/774,023, 9 pages.

United States Patent and Trademark Office, "Advisory Action," dated Feb. 26, 2013 in connection with U.S. Appl. No. 12/774,023, 3 pages.

United States Patent and Trademark Office, "Notice of Panel Decision from Pre-Appeal Brief Review," dated Aug. 8, 2013 in connection with U.S. Appl. No. 12/774,023, 2 pages.

United States Patent and Trademark Office, "Notice of Allowance," dated Mar. 17, 2014 in connection with U.S. Appl. No. 12/774,023, 6 pages.

United States Patent and Trademark Office, "Non-Final Office Action," dated Jun. 5, 2013 in connection with U.S. Appl. No. 12/782,040, 14 pages.

United States Patent and Trademark Office, "Final Office Action," dated Sep. 11, 2013 in connection with U.S. Appl. No. 12/782,040, 13 pages.

United States Patent and Trademark Office, "Advisory Action," dated Nov. 20, 2013 in connection with U.S. Appl. No. 12/782,040, 3 pages.

United States Patent and Trademark Office, "Non-Final Office Action," dated Dec. 17, 2013 in connection with U.S. Appl. No. 12/782,040, 13 pages.

United States Patent and Trademark Office, "Final Office Action," dated Mar. 13, 2014 in connection with U.S. Appl. No. 12/782,040, 14 pages.

United States Patent and Trademark Office, "Advisory Action," dated May 21, 2014 in connection with U.S. Appl. No. 12/782,040, 3 pages.

United States Patent and Trademark Office, "Notice of Panel Decision from Pre-Appeal Brief Review," dated Sep. 11, 2014 in connection with U.S. Appl. No. 12/782,040, 2 pages.

United States Patent and Trademark Office, "Notice of Allowance," dated Nov. 17, 2014 in connection with U.S. Appl. No. 12/782,040, 7 pages.

United States Patent and Trademark Office, "Restriction Requirement," dated Jun. 20, 2017 in connection with U.S. Appl. No. 14/618,071, 5 pages.

United States Patent and Trademark Office, "Non-Final Office Action," dated Oct. 19, 2017 in connection with U.S. Appl. No. 14/618,071, 14 pages.

United States Patent and Trademark Office, "Notice of Allowance," dated May 18, 2018 in connection with U.S. Appl. No. 14/618,071, 20 pages.

United States Patent and Trademark Office, "Non-Final Office Action," dated Mar. 14, 2012 in connection with U.S. Appl. No. 12/789,893, 6 pages.

(56) References Cited

OTHER PUBLICATIONS

United States Patent and Trademark Office, "Non-Final Office Action," dated Aug. 21, 2012 in connection with U.S. Appl. No. 12/789,893, 11 pages.

United States Patent and Trademark Office, "Final Office Action," dated Dec. 4, 2012 in connection with U.S. Appl. No. 12/789,893, 12 pages.

United States Patent and Trademark Office, "Advisory Action," dated Jan. 22, 2013 in connection with U.S. Appl. No. 12/789,893, 3 pages.

United States Patent and Trademark Office, "Non-Final Office Action," dated Apr. 9, 2014 in connection with U.S. Appl. No. 12/789,893, 6 pages.

United States Patent and Trademark Office, "Non-Final Office Action," dated Oct. 3, 2014 in connection with U.S. Appl. No. 12/789,893, 8 pages.

United States Patent and Trademark Office, "Final Office Action," dated Jan. 6, 2015 in connection with U.S. Appl. No. 12/789,893, 6 pages.

United States Patent and Trademark Office, "Advisory Action," dated Feb. 20, 2015 in connection with U.S. Appl. No. 12/789,893, 3 pages.

United States Patent and Trademark Office, "Non-Final Office Action," dated Jun. 4, 2015 in connection with U.S. Appl. No. 12/789,893, 10 pages.

United States Patent and Trademark Office, "Final Office Action," dated Oct. 21, 2015 in connection with U.S. Appl. No. 12/789,893, 10 pages.

United States Patent and Trademark Office, "Advisory Action," dated Jan. 4, 2016 in connection with U.S. Appl. No. 12/789,893, 3 pages.

United States Patent and Trademark Office, "Notice of Allowance," dated Mar. 14, 2016 in connection with U.S. Appl. No. 12/789,893, 7 pages.

United States Patent and Trademark Office, "Corrected Notice of Allowability," dated Mar. 28, 2016 in connection with U.S. Appl. No. 12/789,893, 2 pages.

German Patent Office, "Decision to Grant," dated Jun. 21, 2021 in connection with German Patent Application No. 10 2011 008 793.1, 7 pages.

United States Patent and Trademark Office, "Non-Final Office Action," dated Mar. 2, 2021 in connection with U.S. Appl. No. 16/793,603, 13 pages.

United States Patent and Trademark Office, "Notice of Allowance," dated Sep. 3, 2021 in connection with U.S. Appl. No. 16/793,603, 8 pages.

\* cited by examiner

MESSAGE PASSING FRAMEWORK FOR AUDIO/VIDEO STREAMING IN A TOPOLOGY OF DEVICES

RELATED APPLICATIONS

This patent arises from a continuation of U.S. patent application Ser. No. 16/793,603, filed on Feb. 18, 2020, now U.S. Pat. No. 11,216,235, which is a continuation of U.S. patent application Ser. No. 15/285,600, filed on Oct. 5, 2016, now U.S. Pat. No. 10,564,910, which is a continuation of U.S. patent application Ser. No. 12/821,306, filed on Jun. 23, 2010, which claims benefit of U.S. Provisional Patent Application No. 61/298,936, filed on Jan. 28, 2010. U.S. patent application Ser. No. 16/793,603, U.S. patent application Ser. No. 15/285,600, U.S. patent application Ser. No. 12/821,306, and U.S. Provisional Patent Application No. 61/298,936 are hereby incorporated herein by reference in their entireties. Priority to U.S. patent application Ser. No. 16/793,603, U.S. patent application Ser. No. 15/285,600, U.S. patent application Ser. No. 12/821,306, and U.S. Provisional Patent Application No. 61/298,936 is claimed.

BACKGROUND

This relates generally to devices that source and sink video and audio data.

DisplayPort is a digital audio/video interconnect standard of the Video Electronic Standards Association (VESA). It allows video and audio to be coupled from a computer to a video display or an audio playback system. The DisplayPort connector supports 1, 2, or 4 data pairs in a main link that also carries clock and optional audio signals with symbol rates of 1.62, 2.7, or 5.4 gigabits per second. A 1.1 standard was approved in May 2006 and in 2009 a 1.2 standard, with increased data rates, was announced. The DisplayPort 1.2 standard doubles the bandwidth of the 1.1 standard.

With the DisplayPort 1.2 standard, two WQXGA monitors may sink audio/video data from a single source link or four WUXGA monitors may sink data from a single source link. In addition, the 1.2 standard allows a higher speed AUX which may be used for Universal Serial Bus (USB) peripheral device data transfer, microphone audio transfer, or camera video transfer, to mention a few applications.

Display or sink devices can be connected to source devices, such as personal computers or consumer electronic devices, either directly or through what are called branch devices. Many types of branch devices exist including repeaters that repeat audio or video information, converters that convert audio or video information from one format to another, replicaters, which reproduce the data, and concentrators that take streams from two or more source devices as inputs and transmit them on its downstream links. Interface standards, such as DisplayPort 1.2, allow multiple streams on one link; in such cases, these two or more input streams may be transmitted onto a single downstream link. Some concentrators may operate in a switched fashion, i.e. only one selected source may transmit at a time.

Together, the source, sink, and branch devices form a topology in which a given source may be streaming video to one or more sinks through zero or more branch devices. Active video data flows through links connecting various device types. Each link is constrained by its bandwidth and the number of streams that it supports. A sink will have a limited number of audio and video endpoints to render the stream. Thus, based on the topology, there may be contention for the available video or audio resources.

One such topology, shown in FIG. 1, may include two sources and five sinks, as indicated. A source number 1 wants to stream video to sink number 1 and source number 2 wants to stream video to sink number 2, the link between branch number 2 and branch number 3 is common to both paths. Thus, issues may arise at the source with respect to this contention, including how much bandwidth is available in that or any other link along the path. Another issue is how resources on the path can be reserved. Still another issue is how many audio/visual streams can be driven. Other issues include how access to shared resources can be managed and how errors can be communicated.

DETAILED DESCRIPTION

Figure 1:
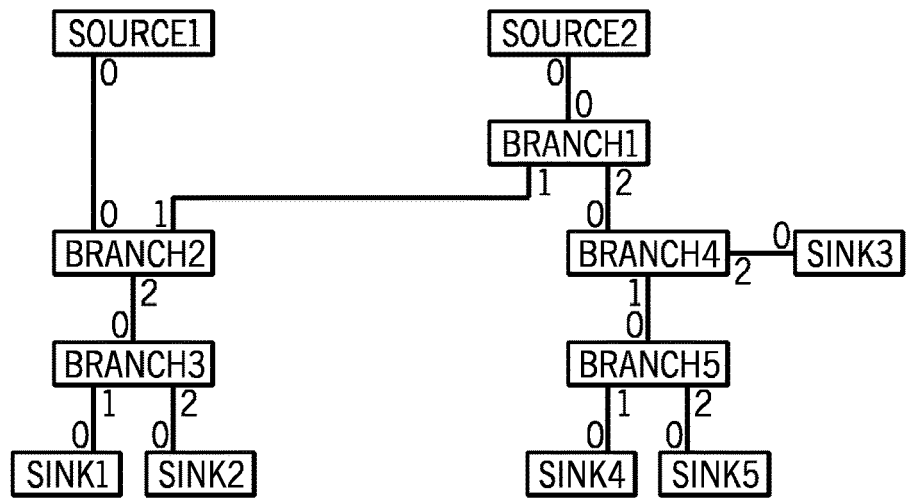
FIG. 1 is a schematic depiction of a audio/video distribution topology in accordance with one embodiment.
Figure 2:
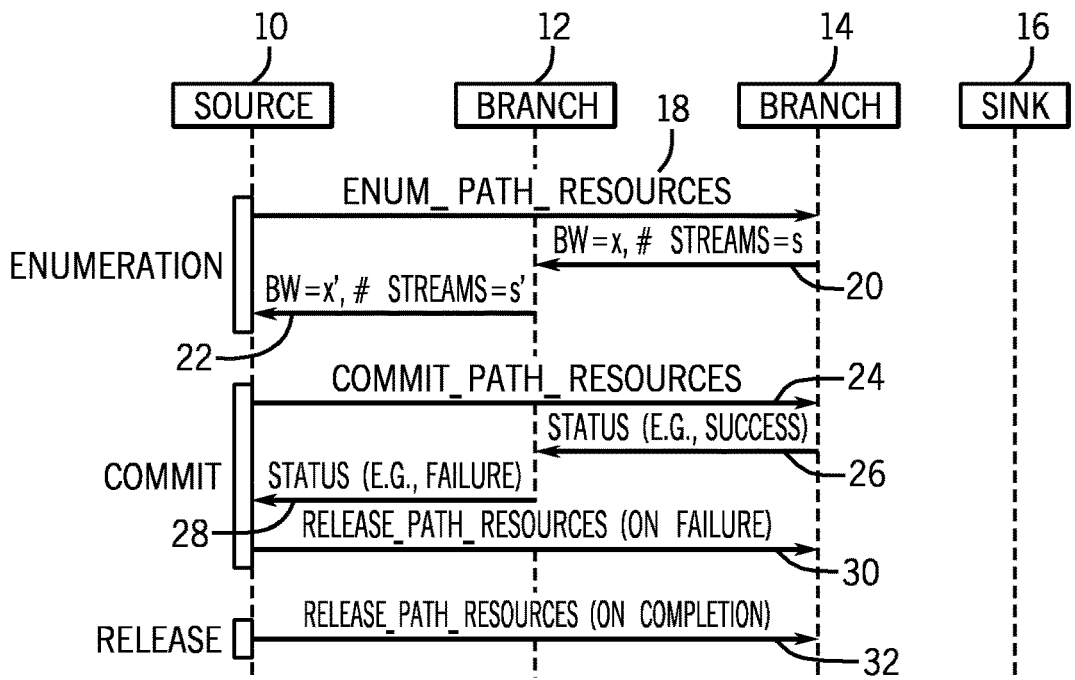
FIG. 2 is a sequence chart for enumeration, commit and release in accordance with one embodiment.

In accordance with some embodiments, specific messages may be exchanged between devices that source and sink video and audio data. Coordinated action may be taken by devices along a path between source and sink devices in response to those messages. Messages may be sent to a targeted destination that is specified by its address. The messages ENUM_PATH_RESOURCES, COMMIT_PATH_RESOURCES, and RELEASE_PATH_RESOURCES may be used, as indicated in FIG. 2. These messages can be sent on the AUX channel in the DisplayPort specification, for example.

Address spaces are generated before message transmission. Each source 10 sends ENUM_PATH_RESOURCE message 18 to the desired sink 16 to enumerate the main link bandwidth and the number of streams. The branch device 14, just upstream of the desired sink 16, responds with the available bandwidth (BW=x) and number of streams (# STREAMS=s), as indicated at 20. Before this reply is propagated further upstream, the upstream branch 12 alters the available bandwidth (BW=x') and stream number (# STREAMS=s') from the downstream branch 14 to reflect what is achievable from the downstream path, as indicated at 22.

Eventually, the source 10 gets the path resources. The message is sent on a control bus (such as AUX on DisplayPort), but the query is for main link resources. There is no reservation of bandwidth on the control bus and control messages are exchanged between devices in the topology, even as the main link resource are completely spoken for by one or two sources.

As part of the processing of the message, each device may need to train the main link along the specified path to determine the amount of bandwidth available as downstream link. Audio resources are also enumerated as part of this procedure. This is to determine the number of end points that are available for streaming in any given point in time.

Link bandwidth enumeration feeds into operating system operations, such as video mode enumeration. Based on this and asynchronous selection by the end user of the video mode to be driven out, a commit procedure may be accomplished using a COMMIT_PATH_RESOURCES message 24 as follows. Enumerated bandwidth may not be available at commit time. For example, different sources may send different ENUM_PATH_RESOURCES messages at any given time to the same sink. They could also be for different sinks with paths that have a common link. As an example, the sequence of source number 1 enumeration, followed by source number 2 enumeration, followed by source number 1 commit, is followed, for example, by source number 2 commit which fails because of the previous source number 1 commit.

The source 10 sends a COMMIT_PATH_RESOURCE message 24 to the sink 16. The message has the desired bandwidth and number of streams. All devices along the specified path (e.g. branches 12 and 14) reserve the resources for this source. The replies 26 and 28 may indicate a success or failure.

Each device propagates COMMIT_PATH_RESOURCES 24 only when it is able to successfully commit the desired resources. In addition to independent resource commits from different source devices, it is possible that the intermediate links along the path may retrain to a lower bandwidth, providing another reason for failure. Link training is the handshake that is performed to make the transmitter or receiver agree on an electrical configuration. To account for a topology of devices, this notion is extended to an entire path, where each link on the path needs to be trained in a coordinated fashion called path training.

It is possible that some devices may have successfully committed resources for a video stream before a downstream device fails to commit. In order to release these resources, the source device may send out a RELEASE_PATH_RESOURCES 30 message after receiving a failure on COMMIT_PATH_RESOURCES.

An active video starts after successful completion of COMMIT_PATH_RESOURCES. Conversely, when the stream is to be terminated, the source issues RELEASE_PATH_RESOURCES 32 to enable release of committed resources at devices along the path.

Figure 3:
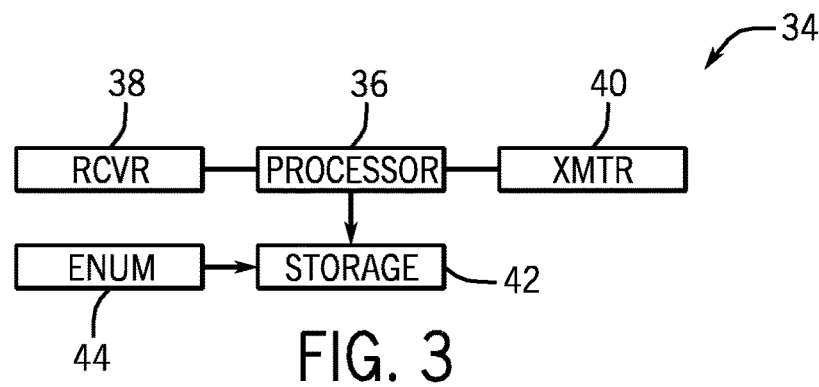
FIG. 3 is a schematic depiction for one embodiment of a branch device.

Referring to FIG. 3, the source 10, sink 16, and each of the branch devices 12 or 14, indicated in FIG. 3 as 34, includes a processor 36. The processor may be coupled to a receiver 38 and the transmitter 40. The processor 36 may also be coupled to a storage 42 which stores software including the enumerate software 44, in one embodiment. Thus, the storage 42 may a computer readable medium that stores instructions executed by the processor 36. The storage 42 may be a semiconductor, optical, or magnetic memory.

Figure 4:
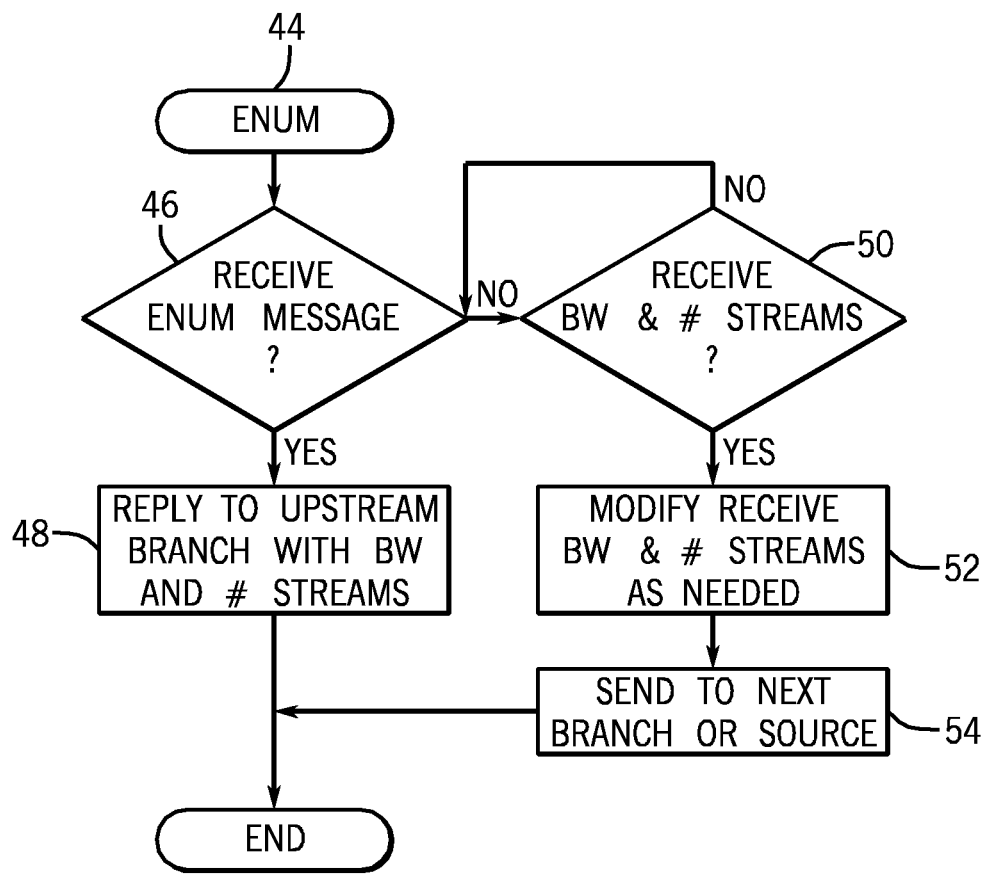
FIG. 4 is a flow chart for enumeration software in accordance with one embodiment.

The enumerate sequence 44, shown in FIG. 4, may be software in one embodiment, but it also may be implemented in hardware or firmware. A check at diamond 46 determines whether an enumerate message has been received by a branch device. If so, the message receiving branch device replies to the upstream branch device with the receiving device's available bandwidth and available number of streams.

If a receiving device does not receive the enumerate message after a period of time, a check at diamond 50 determines if a non-receiving device is an upstream device that receives a message from a downstream device specifying a bandwidth and number of streams. If so, the upstream device modifies the received bandwidth and number of streams needed to reflect its capabilities. It then sends either the original bandwidth and number of streams or the modified numbers, as needed, to the next branch or to the source, as indicated in block 54.

Figure 5:
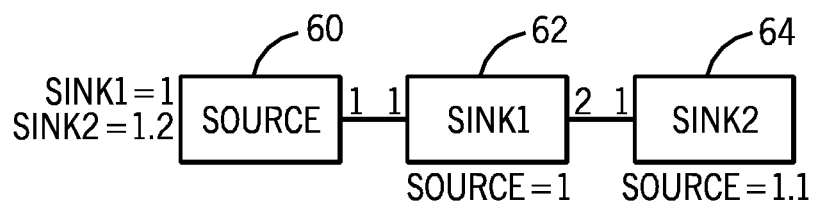
FIG. 5 is a message sequence chart in accordance with one embodiment.

Referring to FIG. 5, a message sequence chart for addition and deletion of a stream includes a source 60 and two sinks 62, 64 with appropriate stream identifiers. The identifier for sink1 62 is "1" and the identifier for sink2 64 is 1.2. Each device includes a port labeled "1" or "2".

Figure 6:
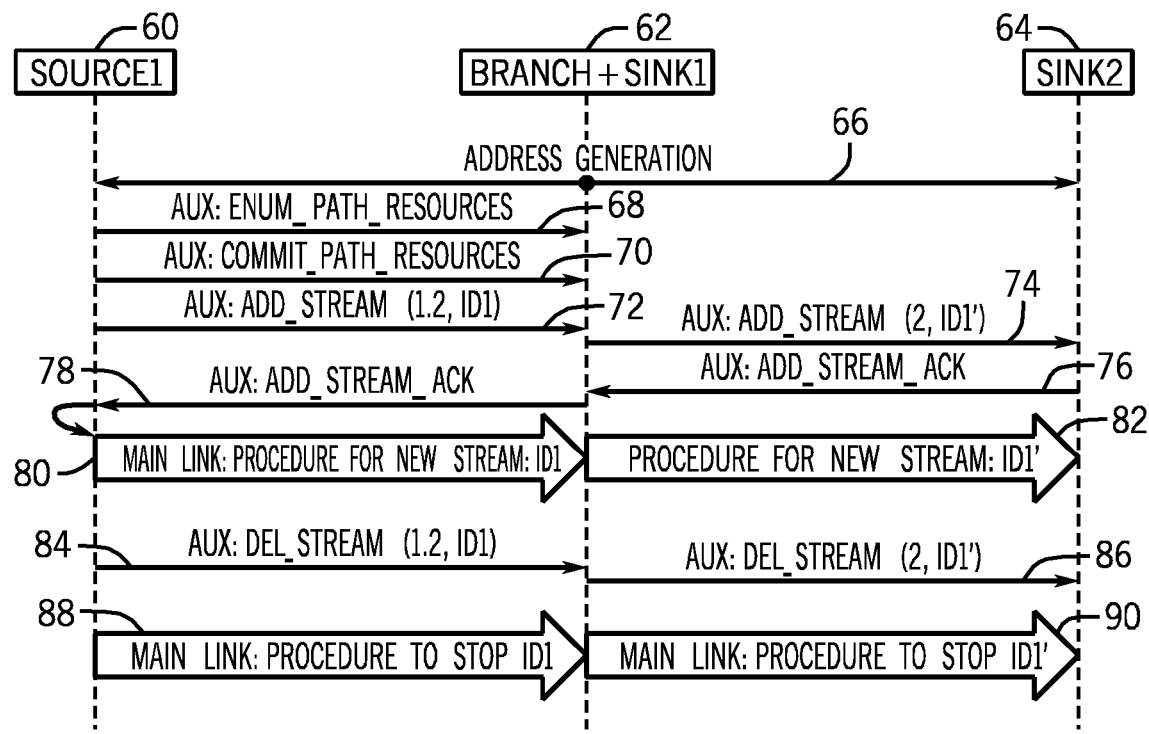
FIG. 6 is a sequence chart for enumeration of path resources in accordance with one embodiment.

Then, referring to FIG. 6, a sequence chart between a source1 60, a branch plus sink1 62, and a sink2 64 is depicted. AUX refers to the control channel and main link refers to the data channel.

Each link in a topology, such as that shown in FIG. 5, for example, may consist of independent control and data channels and the connections are point-to-point. There is an ability to send messages on the control channel to any device using addressing and routing mechanisms. The procedure involves locally unique identifiers for the stream at the sources and maintenance of mapping tables and concentrators, as shown in FIG. 6.

During an address generation phase, addresses are agreed to for each of the devices in the topology by sending address generation messages 66. Then the source sends ENUM_PATH_RESOURCES message 68 to the branch+sink1 62 over the control channel, indicated as AUX. It also sends a COMMIT_PATH_RESOURCES message 70 over the control path as well as to the branch+sink1 62.

Binding is the procedure by which devices in the topology agree on a destination for the next stream. The binding procedure begins, after enumeration, with a source wanting to transmit a new stream, sending out an ADD_STREAM message 72 to the desired destination sink device identified with a locally unique stream identifier (e.g. 1.2 for sink2). All devices along the path from source 60 to sink device 64 remember the stream identifier and the input port (e.g. 1 or 2) on which the stream has been received in their mapping tables.

Each branch device 62 performs a mapping of the input stream identifier (ID 1 for itself) to an output stream identifier (1.2 for sink2 64). In the absence of multiple sources, the input stream identifier is the same as the output stream identifier. Each branching device remembers the output stream identifier and output port number in its mapping table as well.

Finally, the branch devices forward the message onwards to the destination as indicated by the route/address contained in the message, assuming there are no other resource constraints on those devices, as indicated at 74. In case of such resource constraints, the branch device simply sends a negative acknowledgement to the source. The message ends at the desired destination. If the sink device is able to receive the stream, it responds with an acknowledgement 76 to the source. Otherwise, the sink device sends a negative acknowledgement. Then the sink knows that it needs to consume the next new stream that is on the data channel. All branch devices propagate the acknowledgements 78 back up to the source.

Upon receipt of the acknowledgement, the source device sends the new stream 80 out on the data channel on its link that leads to the desired destination. The branch device routes the stream along the path for the new stream as remembered from their mapping tables, as indicated at 82. The sink device knows it needs to consume the new stream based on the message it had previously received and presents the stream on the display.

Unbinding or deletion is performed through the delete stream message 84, 86 sent to the intended destination with the same stream identifier. This causes the sink device to expect stoppage of the stream and for the branch devices to alter their mapping tables accordingly. Receipt of an acknowledge message to a delete stream message triggers the source to stop sending the stream on the data channel.

Figure 7:
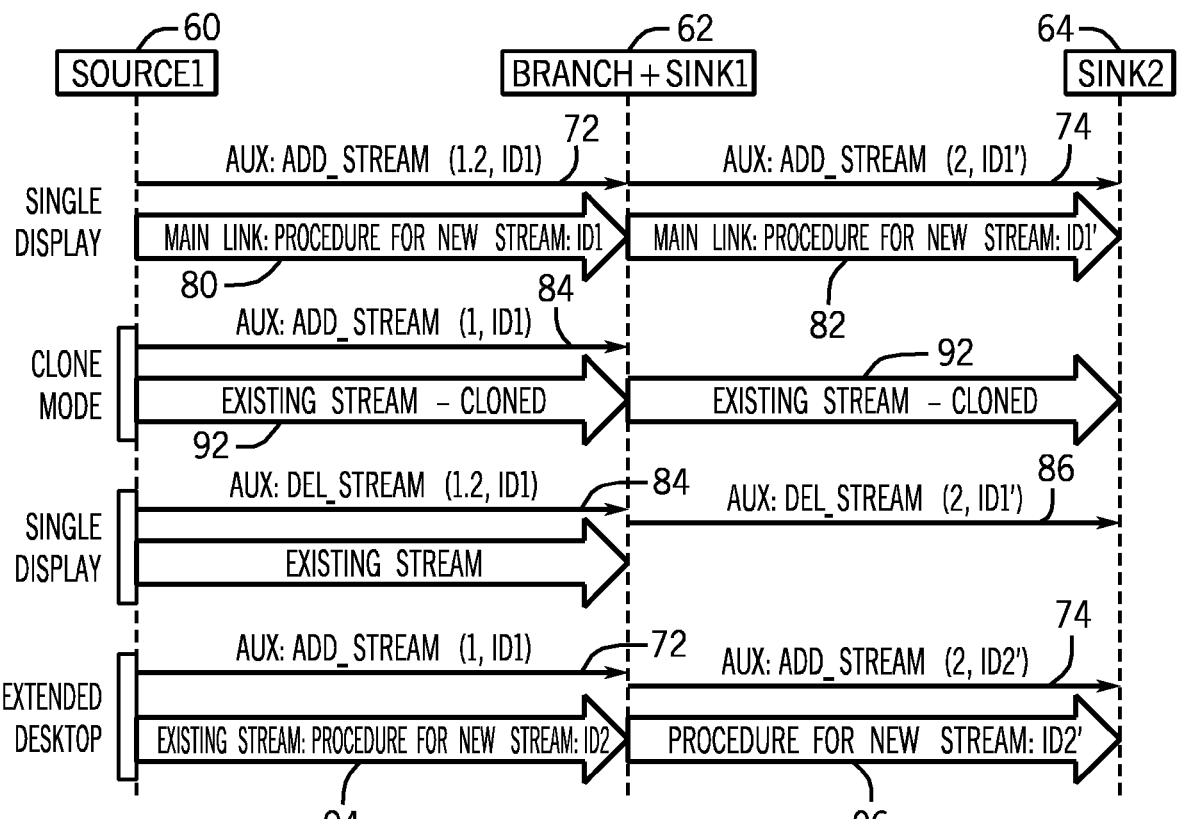
FIG. 7 is a sequence chart showing how various display configurations can be established for the topology shown in FIG. 6.

In FIG. 7, various display configurations can be established for the topology shown in FIG. 4. A "single display" configuration is simply one display device that presents audio video data. It uses the messages 72, 74, 80, 82, 84, and 86 already described. The "clone mode" configuration is where the same content 92 is sent to be displayed on two monitors or display devices. "Extended desktop" is an alternative dual display configuration in which different images 94, 96 are shown on both monitors.

Figure 8:
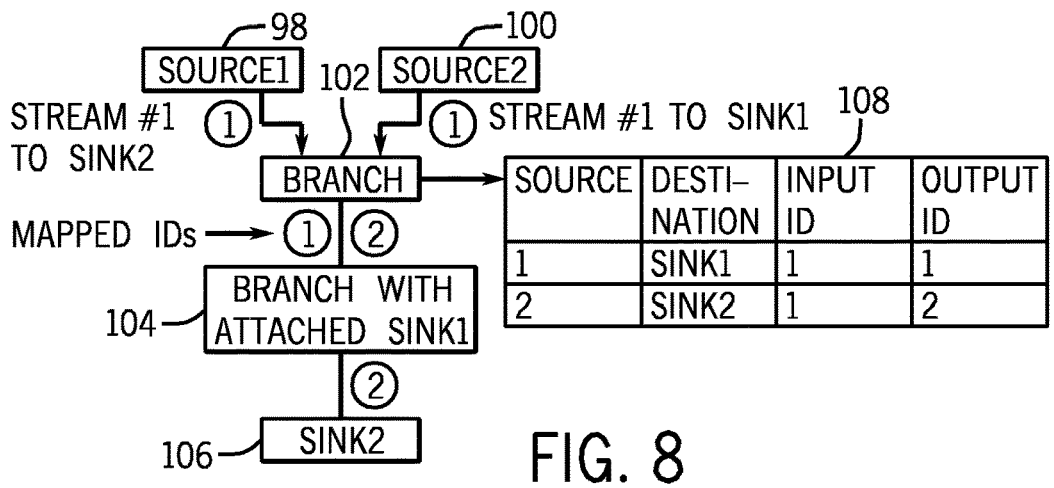
FIG. 8 is a depiction of a potential mapping between two sources and two sinks in accordance with one embodiment.

When multiple sources are present in the topology, as indicated in FIG. 8, from source1 98 and source2 100, each source may issue an ADD_STREAM message with the same stream identifier (in this case #1) at the same time on an overlapping path. In this case, a concentrator branch device 102 that is on the overlapping path for these new streams only propagates an ADD_STREAM message for one source (in this case source1), while blocking the others. That is, only one new stream can be added at a time. After the unblocked source's message has been conveyed on the data channel, an additional ADD_STREAM message is propagated for the blocked source.

In the presence of multiple input ports on a branch device 104, the next available stream identifier is assigned and the branch device remembers the input stream identifier and port number to its output stream identifier and port number in its mapping table 108.

As one use case, a new stream may be added. The concentrator branch device adds a new entry to its mapping table when it sees an add stream message with an identifier that is not active. If needed, it generates a new output identifier for that stream and uses that while propagating the ADD_STREAM message. A concentrator branch device may add a destination address for this identifier in its mapping table. Another use case is an existing stream extended. If the same source adds a second sink to a stream that is already active through another ADD_STREAM message, the concentrator branch device will not add a new entry in its mapping table since the mapping it had already created is still valid. However, the concentrator does add the second destination address to its input identifier in its mapping table.

Still another use case is the removal of a sink from a stream. The concentrator marks the address of the sink for deletion from a list of destination devices when it receives a delete stream message with that sink's address for an active identifier. Subsequently, when it receives a delete stream acknowledgement message from the sink device, it propagates the message back to the source using the mapping table to alter the identifier that will be recognized by the source. It then deletes the sink's address for that stream from its mapping table. If that was the last sink receiving the stream with that identifier, it deletes the entry from its mapping table. Otherwise, if there is at least one other sink consuming the stream with that identifier, the entry in the mapping table is not deleted.

Figure 9:
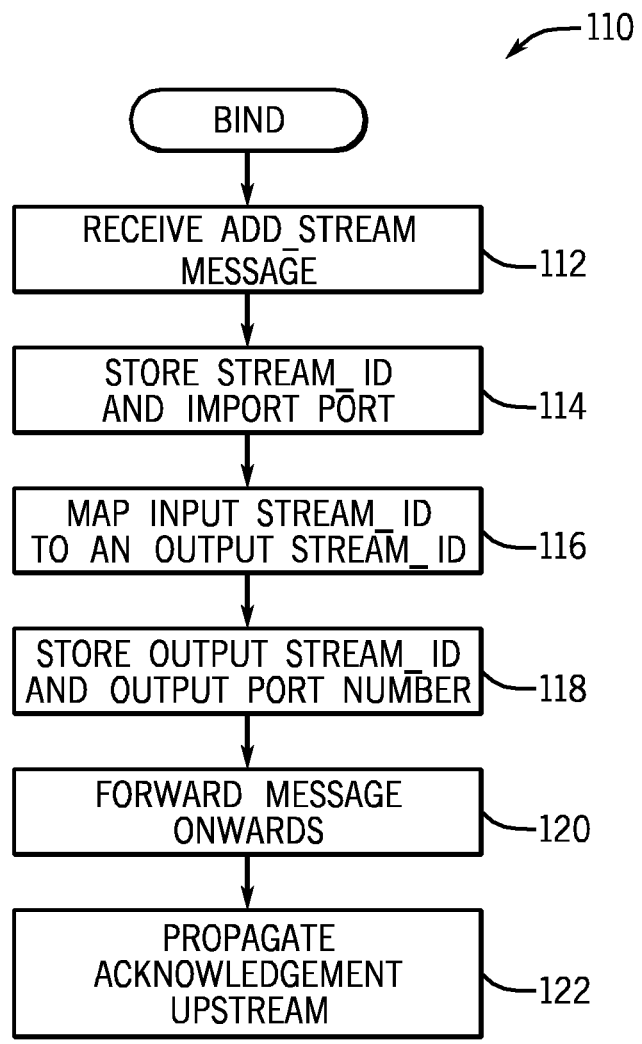
FIG. 9 is a flow chart for one embodiment.

Referring to FIG. 9, a sequence 110, in accordance with one embodiment for implementing the binding described above, is depicted. The sequence may be implemented in software, hardware, or firmware. In software embodiments, the sequence may be implemented by instructions executed by a processor, such as the processor 36 shown in FIG. 3, for a branch device 34. In such case, the sequence may be stored on the storage 42.

Initially, a branch device receives an ADD_STREAM message, as indicated in block 112. It stores the STREAM_ID and the input port from that message in its mapping table, as indicated in block 114. Then the branch device maps the input STREAM_ID to an output STREAM_ID, as indicated at block 116. It stores the output STREAM_ID and output port number in its mapping table, as indicated in block 118. Then it forwards the message onwards, as indicated in block 120. Ultimately, if the message is successfully delivered, an acknowledgment message will be received from a downstream device and the branch device forwards the acknowledgement message upstream, as indicated in block 122.

Figure 10:
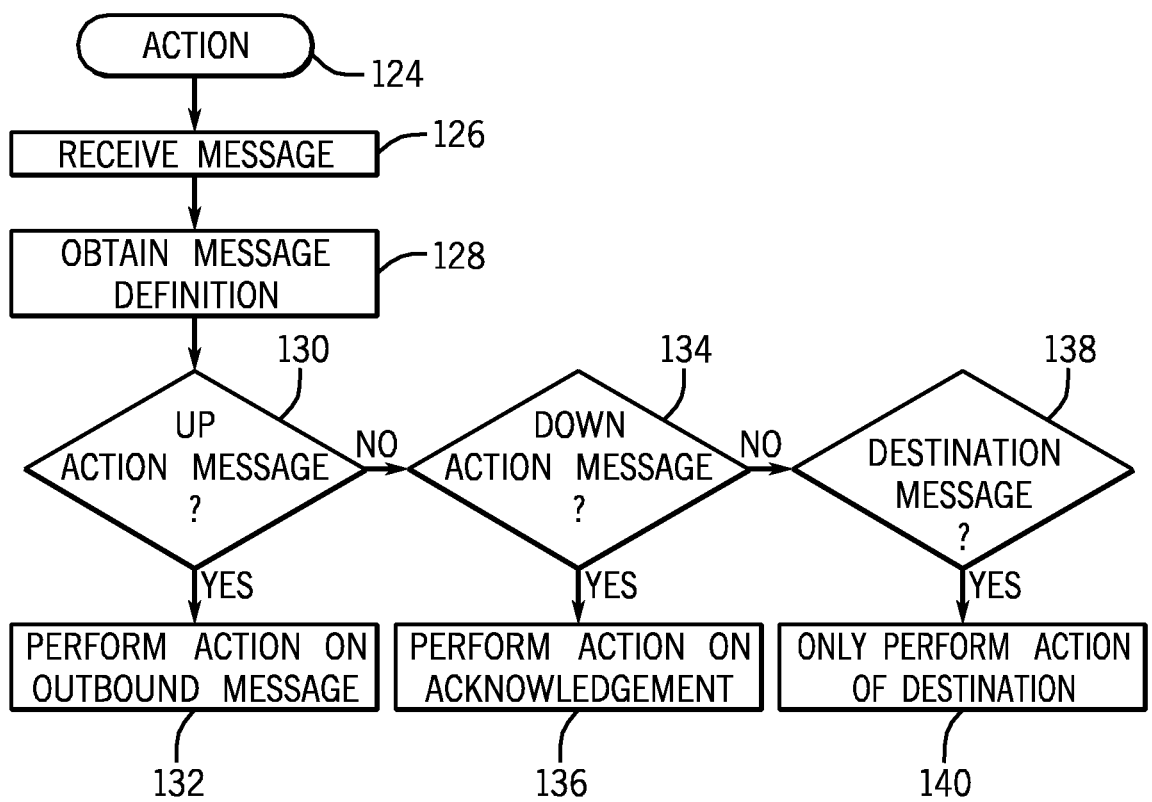
FIG. 10 is a flow chart for one embodiment.

In some embodiments, a message passing framework 124, shown in FIG. 10, may allow for action by all devices along a path or action only by the destination device. Messages have identifiers, with a new identifier being allocated as each new message is defined. The definition of a message includes determination of whether it is a path or a destination message. Path messages are of two types, depending on the direction in which the action is performed, on the way down towards the sink, in which case it is a down action path message, or on the way back up to the source device, in which case it is up action path message. Messages may be initiated by any device in the topology. Each message has a destination address and associating routing information.

The message passing framework 124, shown in FIG. 10, may be implemented in software, hardware, or firmware. For example, it may be implemented in software in the form of instructions stored on a computer readable medium, such as the storage 42 shown in FIG. 3, in the device 34, which may be a branch device or sink device, for example.

In accordance with one embodiment, the sequence shown in FIG. 10 begins by receiving a message from an upstream device, as indicated in block 126. The device receiving the message may be a branch device or a sink device, as two examples. The receiving device, whether it is the ultimate destination or not, obtains the message definition, as indicated in block 128. Then, in diamond 130, the device checks to determine whether an up action message is indicated by the message definition. If so, it performs the actions requested in the message on receipt of the message, as indicated in block 132.

Otherwise, it is not an up action message, a check at diamond 134 determines whether it is a down action message. If it is a down action message, as indicated in block 136, the actions are performed on the acknowledgement, as opposed upon the receipt of the message.

Conversely, if it is not a down action message, then, as determined in diamond 138, if it is a destination message, the action is only performed if the device receiving the message is the ultimate destination, as indicated in block 140.

The message passing framework enables devices to perform coordinated action on a specified path in a point-to-point topology of connected audio visual source, branch, and sink devices. The framework can be used for a variety of operations including topology discovery, address generation, routing, binding and stream management, resource management, and power management.

Figure 11:
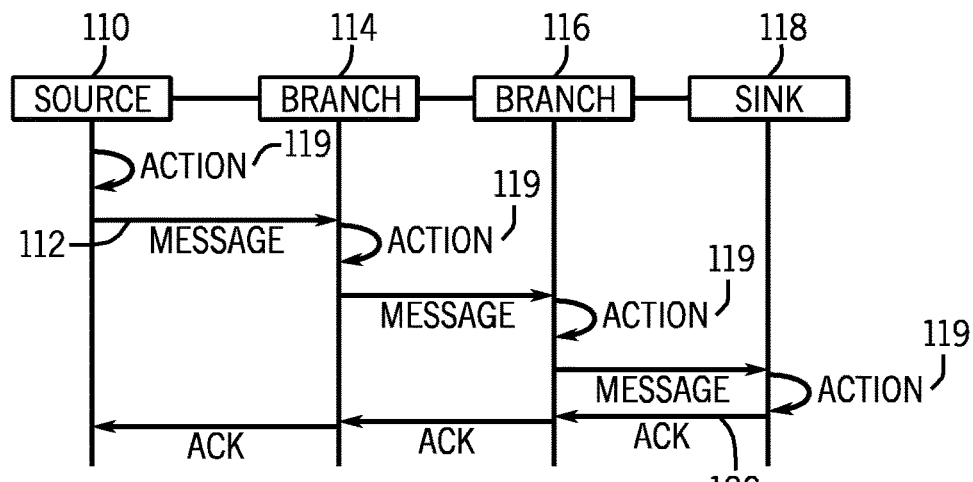
FIG. 11 shows a message sequence in accordance with one embodiment.

A down action message, shown in FIG. 11, works as follows. Prior to sending a message, the source 110 performs any message specific action 119 needed. The message 112 is sent only if the source action succeeds. The source device transmits a message to the destination device by sending it on a downstream port, as determined based on the address/routing information. Each branch device 114 or 116 or sink 118 that receives the message performs action 119 as required by that message type. Upon the successful completion of action at the destination (e.g. sink 118), it responds with an acknowledgement (ACK) 120. This acknowledgement is propagated back up to the source.

Figure 12:
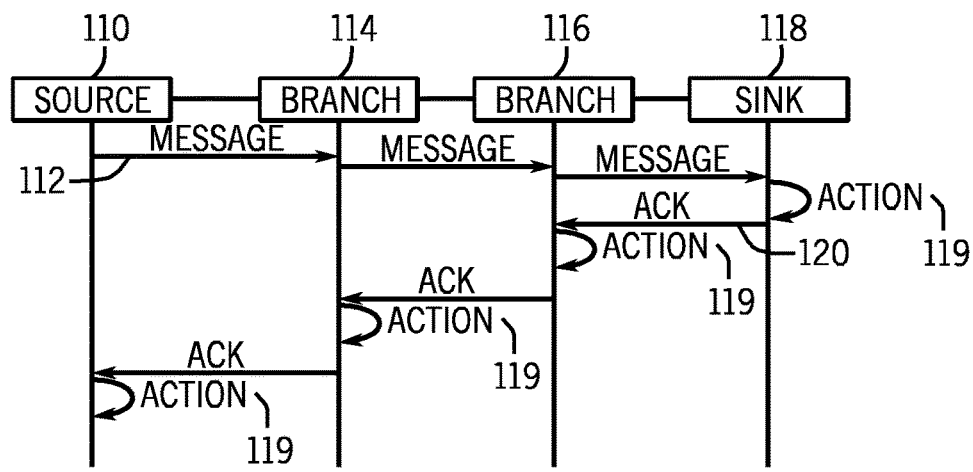
FIG. 12 is an up action path message sequence in accordance with one embodiment.

An up action message 122 works as depicted in FIG. 12. Here, the actions 119 are done as part of the acknowledgement 120.

Figure 13:
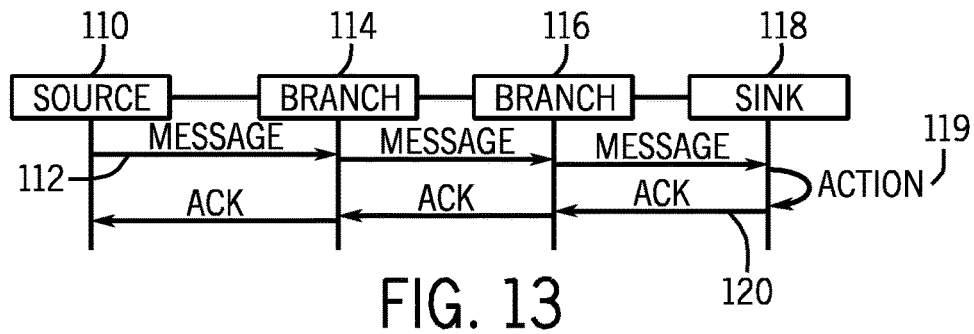
FIG. 13 is a mapping of destination sequences in accordance with one embodiment.

Destination messages work as depicted in FIG. 13. Action 119 is only done by the destination, in this example, the sink 118. The other devices in the path simply forward the message and the acknowledgement.

Figure 14:
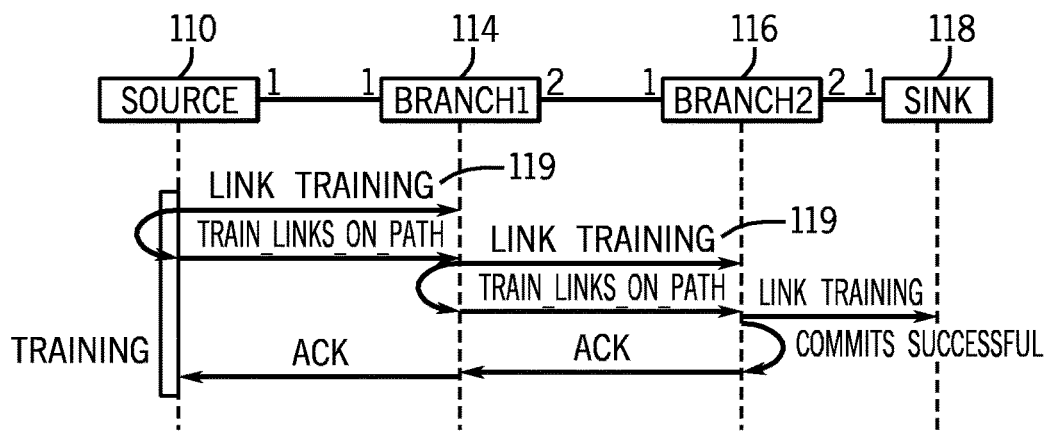
FIG. 14 is a message sequence chart for an uplink action path message in accordance with one embodiment.

A use of a down action path message is illustrated in FIG. 14 for path training, which is training all the links on a path. In FIG. 13, the action 119 at each device is link training. The message used is TRAIN_LINKS_ON_PATH, although any other message could be used. In FIG. 13, the message is directed at branch 116.

Figure 15:
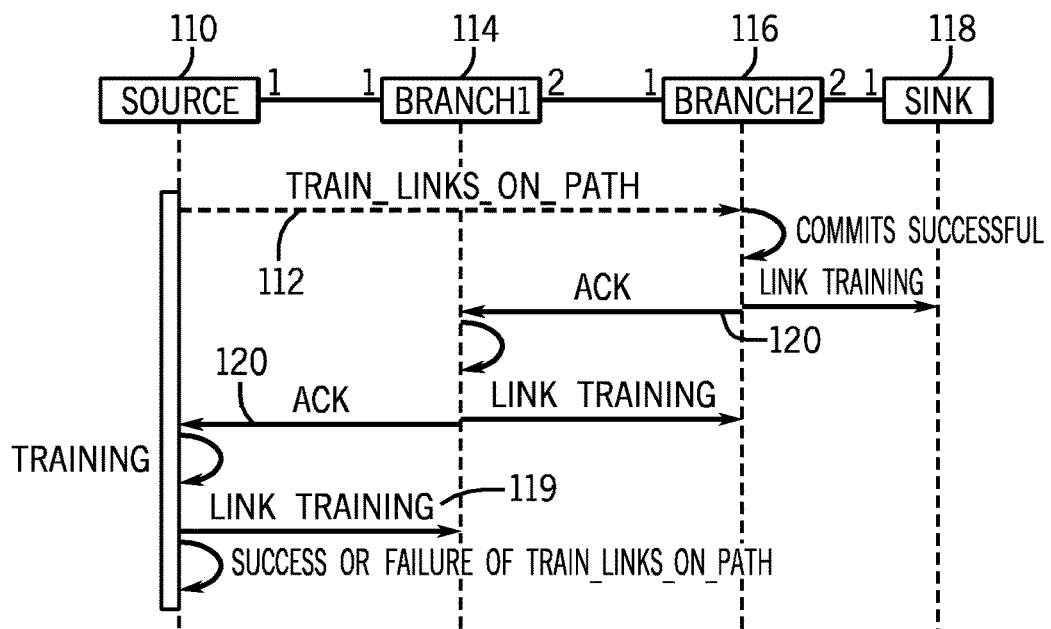
FIG. 15 is a depiction of connections between source and branch devices in accordance with one embodiment.

FIG. 15 is a message sequence chart for TRAIN_LINKS_ON_PATH when implemented as an up action message. Here, the actions 119 all occur as part of the acknowledgements 120.

An interface-specific framework may enable a source device to determine that the functions enumerated through different paths are part of the same device. The DisplayPort Standard is an example of an "interface." Different paths for enumeration can be: a) paths featuring different interface types or b) just different paths within the same interface type. The framework enables a device to be used in conjunction with container identifier initiatives that Microsoft® Windows® and other technologies, such as Universal Serial bus (USB) support, and enables device centric rather than function centric user interfaces for connected devices.

The framework may include a 16 byte globally unique identifier (GUID) exposed through a set of container_ID registers (which could be DisplayPort configuration data (DPCD) in the case of DisplayPort). The DPCD is essentially a set of registers used for status checking, command communication, and providing context for an interrupt. The container_ID registers may be supported on branch devices, composite sink devices, and any device that has multiple transports.

A sink device with a given number of video end points is expected to respond with that number of Extended Display Identification Data (EDID) structures. The EDID data structure tells the source about the capabilities of the monitor. EDID is a VESA standard. When a sink device has an integrated Universal Serial Bus (USB) or hub device, the globally unique identifier of the sink matches the globally unique identifier in the container descriptor of that USB device or hub. All functions that are integrated into the device advertise the same globally unique identifier, regardless of the interface type through which they are accessed. In a sink that has multiple video end points, the container_ID registers from each address returns the same globally unique identifier. For each device in the topology, the source device reads the globally unique identifier as part of the topology discovery process. If the device contains a globally unique identifier, the source device reads the globally unique identifier to determine if the same device has been accessed for multiple paths or through multiple interfaces.

Otherwise, a source device infers the functions that are in the same physical device through some interface specific means. In the case where the interface is a DisplayPort Standard, this can be based on the relative address (RAD) of the downstream device. When faced with a topology of devices, each device initiating communication needs to generate an address for the destination device that is valid in the network. That address is called the relative address because the address generated by each device is valid but could be different from what is generated on another source for the same destination. Then, the source reads the EDID from each relative address. A globally unique identifier is generated and associated with the device as identified through EDID. This generated globally unique identifier is used with the container identifier framework in the operating system.

Thus, the EDID contains a unique serial number in some embodiments. If this is not valid, there is a change of the same globally unique identifier being associated with multiple EDIDs, resulting in poor user experience.

Figure 16:
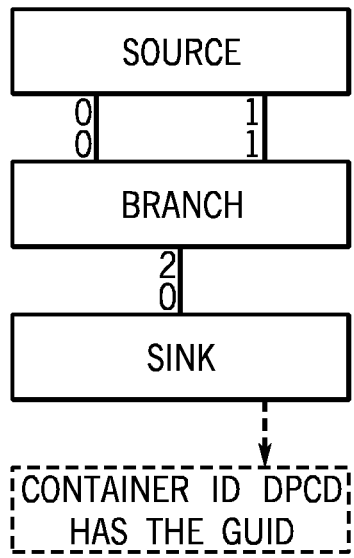
FIG. 16 is a depiction of multiple source and branch devices according to one embodiment.

Multiple connections between source and branch devices are shown in FIG. 16. In this case, the source generates two addresses for the sink device since there are two paths to that sink. Since the source reads the same globally unique identifier through both paths, it is able to infer that both paths read the same sink device. Had the globally unique identifier been missing, the source reads the EDID from both paths which would be the same, generates a globally unique identifier, and associates that globally unique identifier with the sink device. This identifier is then returned to the operating system.

Figure 17:
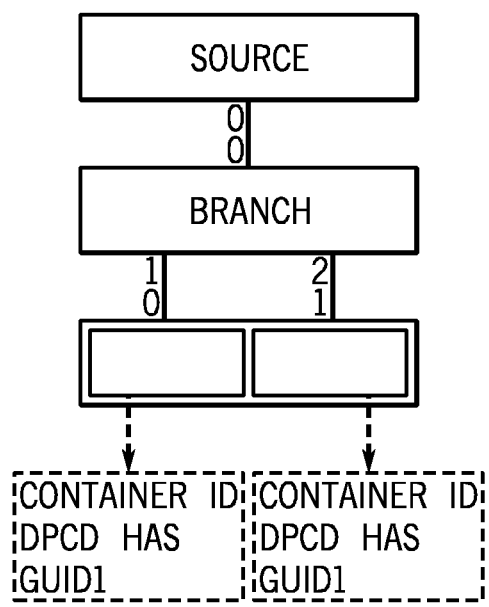
FIG. 17 is a depiction of a topology with two video end points in accordance with one embodiment.

FIG. 17 shows an example with two video end points. The sequence of the source is as follows. The source again generates two addresses, one for each video end point in the sink device. The source reads the container identifier for the register from each video end point address. Since the sink has two interfaces into it, the framework requires a globally unique identifier to be present in the sink and requires that globally unique identifier to be the same in both interfaces. The source detects that the globally unique identifier is the same and infers that the two video end points are part of the same physical device.

Figure 18:
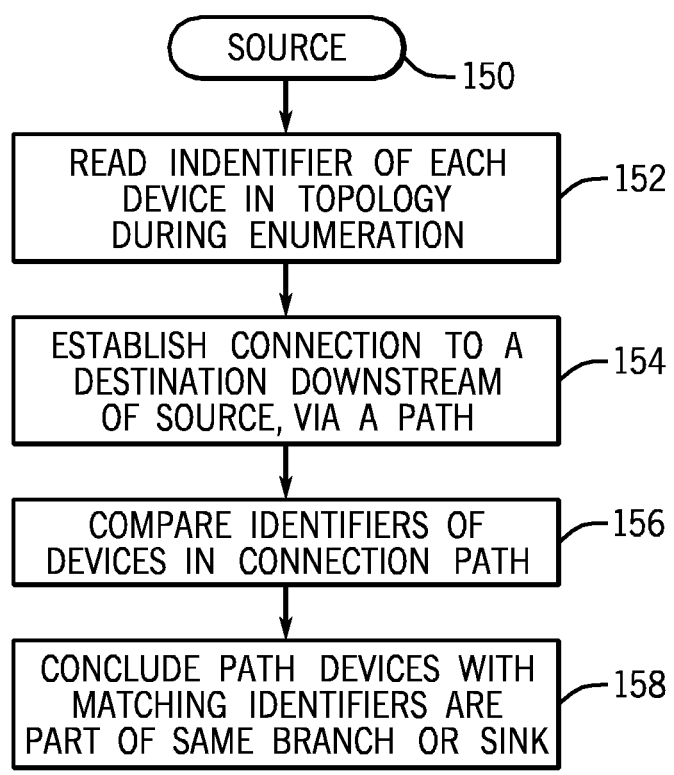
FIG. 18 is a flow chart for one embodiment.

Referring to FIG. 18, in accordance with one embodiment, a sequence 150 may be implemented by a source in the form shown in FIG. 3. In some embodiments, the sequence shown in FIG. 18 may be implemented in software, hardware, or firmware. In software embodiments, it may be implemented by a sequence of instructions executed by a processor, such as the processor 36, and stored on a storage device 42.

During an initial enumeration or topology discovery phase, an identifier is read for each device in the topology (block 152). In other words, the source obtains the identifier for the devices in the topology. That identifier can be any of the identifiers already discussed herein. Then the source establishes a connection to a destination downstream of the source via a path, as indicated at block 154. Then the source compares the identifiers of the device in the connection path, as indicated in block 156. If, as determined in block 158, the identifiers match, the source concludes that the path devices with matching identifiers are part of the same branch or sink device. Thus, the ambiguity that may arise when two devices have the same identifier may be handled easily, in some embodiments.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A storage device comprising instructions that, when executed, cause a processor to at least:
    obtain a first global unique identifier (GUID) via an auxiliary channel during topology discovery, the first GUID corresponding to a first video or audio endpoint;
    obtain a second GUID via the auxiliary channel during the topology discovery, the second GUID corresponding to a second video or audio endpoint; and
    determine that the first video or audio endpoint and the second video or audio endpoint are part of a same device when the first GUID corresponding to the first video or audio endpoint matches the second GUID corresponding to the second video or audio endpoint, the same device to store the first GUID in a first GUID register, the first GUID register being one of first DisplayPort configuration data (DPCD) registers, and the same device to store the second GUID in a container descriptor of the second video or audio endpoint.

2. The storage device of claim 1, wherein the first video or audio endpoint includes at least one of a receiver function or a transmitter function.

3. The storage device of claim 2, wherein the second video or audio endpoint includes a universal serial bus device.

4. The storage device of claim 3, wherein the universal serial bus device is in the same device.

5. The storage device of claim 1, wherein the same device is a branch device.

6. The storage device of claim 1, wherein the same device is a sink device.

7. The storage device of claim 1, wherein the container descriptor is in an address space corresponding to the second video or audio endpoint.

8. An apparatus comprising:
    a transmitter;
    a receiver;
    memory;
    instructions; and
    processor circuitry to execute the instructions to:
        access a first global unique identifier (GUID) obtained via an auxiliary channel during topology discovery, the first GUID corresponding to a first video or audio endpoint;
        access a second GUID obtained via the auxiliary channel during the topology discovery, the second GUID corresponding to a second video or audio endpoint; and
        determine that the first video or audio endpoint and the second video or audio endpoint are part of a same device when the first GUID corresponding to the first video or audio endpoint matches the second GUID corresponding to the second video or audio endpoint, the same device to store the first GUID in a first GUID register, the first GUID register corresponding to first DisplayPort configuration data (DPCD) registers, and the same device to store the second GUID from a container descriptor of the second video or audio endpoint.

9. The apparatus of claim 8, wherein the first video or audio endpoint includes at least one of a receiver function or a transmitter function.

10. The apparatus of claim 9, wherein the second video or audio endpoint includes a universal serial bus device.

11. The apparatus of claim 10, wherein the universal serial bus device is in the same device.

12. The apparatus of claim 8, wherein the same device is a branch device.

13. The apparatus of claim 8, wherein the same device is a sink device.

14. The apparatus of claim 8, wherein the container descriptor is in an address space of the second video or audio endpoint.

15. An apparatus comprising:
    receiver circuitry to obtain a first global unique identifier (GUID) and a second GUID topology discovery via an auxiliary channel, the first GUID corresponding to a first video or audio endpoint, and the second GUID corresponding to a second video or audio endpoint; and
    processor circuitry to determine that the first video or audio endpoint and the second video or audio endpoint are part of a same device when the first GUID matches the second GUID, the same device to store the first GUID in a first GUID register, the first GUID register being one of a plurality of DisplayPort configuration data (DPCD) registers, and the same device to store the second GUID in a container descriptor of the second video or audio endpoint.

16. The apparatus of claim 15, wherein the first video or audio endpoint includes at least one of a receiver function or a transmitter function.

17. The apparatus of claim 16, wherein the second video or audio endpoint includes a universal serial bus device.

18. The apparatus of claim 17, wherein the universal serial bus device is in the same device.

19. The apparatus of claim 15, wherein the same device is a branch device.

20. The apparatus of claim 15, wherein the same device is a sink device.

21. The apparatus of claim 15, wherein the container descriptor is in an address space of the second video or audio endpoint.

* * * * *